_US005532898A_

United States Patent [19]

Price

[11] Patent Number: 5,532,898
[45] Date of Patent: Jul. 2, 1996

[54] LINE CURRENT PROTECTION CIRCUIT FOR USE WITH A PCMCIA-ARCHITECTURE MODEM CARD

[75] Inventor: Tim U. Price, Salt Lake City, Utah

[73] Assignee: Megahertz Corporation, Salt Lake City, Utah

[21] Appl. No.: 221,940

[22] Filed: Apr. 1, 1994

[51] Int. Cl.[6] .......................... H02H 3/26; H04M 11/00
[52] U.S. Cl. ...................... 361/119; 361/93; 361/100
[58] Field of Search .......................... 361/102, 91, 93, 361/119, 7, 5, 6, 42, 45, 100; 379/412, 93, 443, 98

[56] References Cited

U.S. PATENT DOCUMENTS

| | | | |
|---|---|---|---|
| 3,903,375 | 10/1975 | Dewit | 179/18 HB |
| 4,317,964 | 3/1982 | Biggs et al. | 179/18 R |
| 4,603,234 | 7/1986 | Huet et al. | 179/16 AA |
| 4,709,296 | 11/1987 | Hung et al. | 361/102 |
| 4,723,267 | 2/1988 | Jones | 379/93 |
| 4,958,371 | 9/1990 | Damoci et al. | 379/377 |
| 5,042,065 | 8/1991 | Kim | 379/165 |
| 5,125,027 | 6/1992 | Blaszykowski et al. | 379/399 |
| 5,140,631 | 8/1992 | Stahl | 379/377 |
| 5,369,687 | 11/1994 | Farkas | 379/98 |

Primary Examiner—Howard L. Williams
Assistant Examiner—Stephen Jackson
Attorney, Agent, or Firm—Workman, Nydegger & Seeley

[57] ABSTRACT

A novel line-current protection circuit that is useable with a PCMCIA modem card is disclosed. The protection circuit is adapted to detect when an excessive voltage is present across the tip and the ring leads of a telephone subscriber loop by sensing the amount of line-current being supplied to line interface circuitry disposed on the PCMCIA modem card. The protection circuit includes a current sensing circuit portion that is placed in series with the tip lead and which detects when the line current exceeds a predetermined maximum amount. In the event the line current exceeds the maximum amount, the current sensing circuit asserts an excessive line current signal which is being monitored by a digital processor. The digital processor responds by causing a relay circuit to be opened, thereby causing the PCMCIA modem to be in an "on-hook" state. When the magnitude of the line-current does not exceed the predetermined maximum amount, the excessive line current signal is not asserted and the digital processor responds by closing the relay circuitry, thereby causing the PCMCIA modem to be in a "off-hook" state. The protection circuit also includes a backup fuse, which will trip if the primary components of the protection circuit fail.

23 Claims, 4 Drawing Sheets

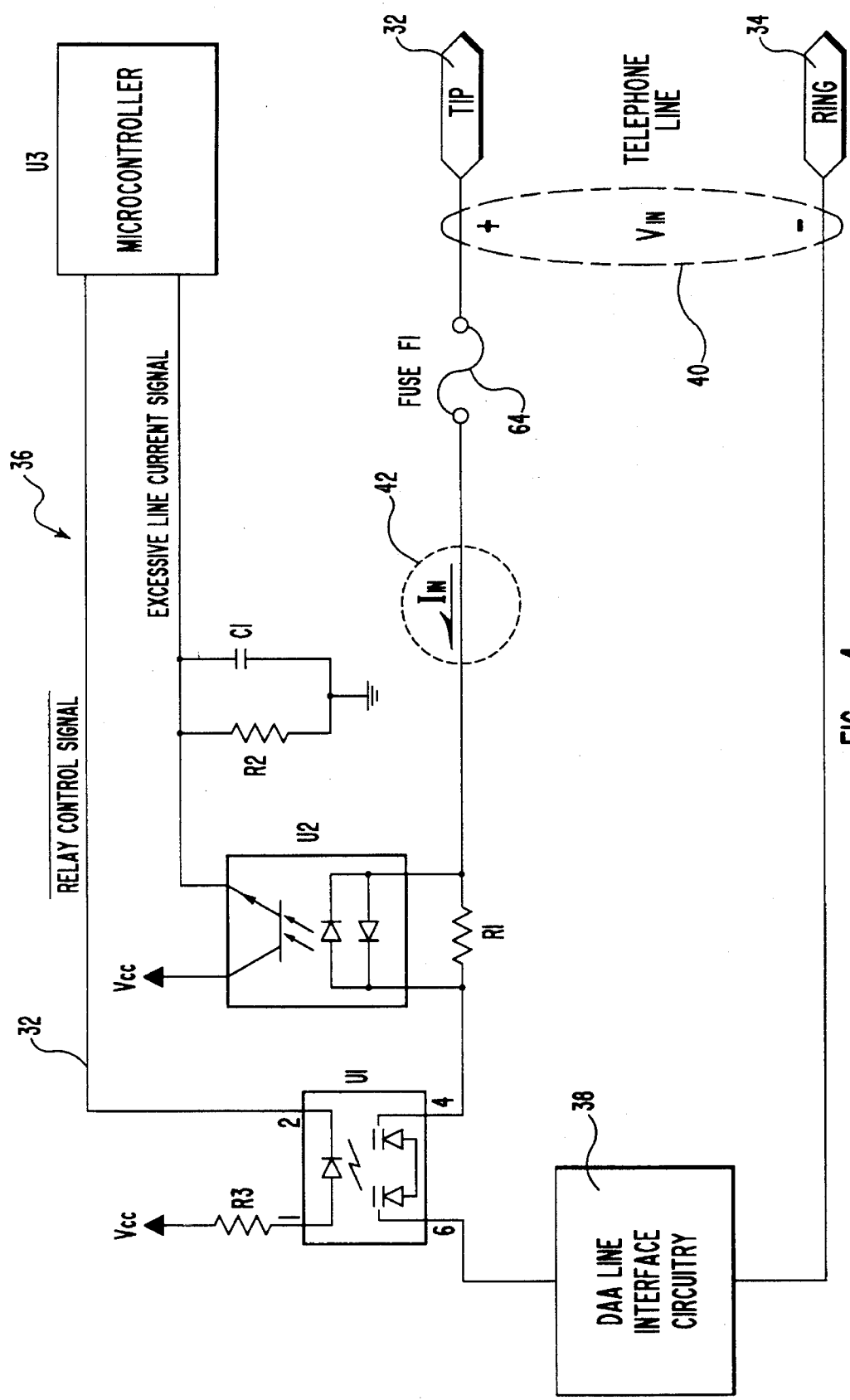

LINE CURRENT PROTECTION CIRCUIT FOR USE WITH A PCMCIA-ARCHITECTURE MODEM CARD

BACKGROUND

1. Field of the Invention

This invention relates to modem communication systems that are used by computer equipment to communicate data across public or private telephone lines. More particularly, the invention relates to a line-current protection circuit, for use in a PCMCIA modem card, which protects modem circuitry from being damaged by an excessively high line current that can be supplied via the telephone subscriber line.

2. Background Art

Increasingly, users of personal computers and related computer equipment rely on the ability to utilize public and private telephone lines to transmit and receive data. This capability dramatically increases the value of the computer, and the productivity of the computer user. As the number of remotely accessible public and private networks, databases, computer-based bulletin boards and related computer services continues to expand, the need for this communication capability will continue to grow.

As is well known, computer equipment, such as personal computers, communicate across telephone lines via a piece of equipment known as a "modem." The term modem is an acronym derived from the phrase "modulator-demodulator," which is descriptive of the basic function performed by the modem. A modem permits the personal computer, which is a digital device, to be interfaced with telephone lines by modulating the outgoing digital data so that it is compatible with telephone networks, which are designed to handle analog signals (e.g., speech traffic). Similarly, the modem reverses that process by demodulating incoming analog data from the telephone line so that it is in a digital form that is useable by the computer.

The manner in which telephone equipment is interfaced to a public or private telephone network—both physically and electrically—has been largely standardized. This standardization is due to the universal need for telephonic systems and equipment to be both compatible and interchangeable. One of the more thoroughly standardized components of the telephone are the physical media connectors through which a piece of telephone equipment is physically and electrically connected to the telephone subscriber line. The standard media connector used in the United States is the RJ-11, 6-pin miniature module and plug. As is well known, most telephone equipment is equipped with the RJ-11 module, into which is received the RJ-11 plug and associated twisted-pair telephone cable, which is then plugged into, for instance, a telephone wall jack, also a standard RJ-11 module. In this manner, the telephone, modem, or other related telephone equipment is physically and electrically interfaced with the telephone subscriber loop. Voice or transmission data is then transmitted in analog form through the RJ-11 physical/electrical media connector into the telephone line.

The manner in which telephone equipment, such as a modem, must electrically interface with the public telephone system has also been standardized so as to provide a compatible interface. Generally, modem manufacturers must provide an electrical line interface that moderates all signals or energy being input by the modem into the telephone line. This standard interface is required by the Federal Communications Commission (FCC) and the various telephone companies. The line interface protects the telephone lines and central telephone systems from being damaged, and thereby insures the integrity and quality of transmissions over the telephone lines.

This line interface circuitry is referred to as the Data Access Arrangement (DAA) circuit. The DAA line interface circuit provides an impedance match between the telephone equipment and the telephone line, and it also isolates and protects the telephone equipment from transient signals and other electrical disturbances that may be present on the telephone line. The DAA line interface circuit also protects the telephone line from any disabling electrical influences that may be generated by the telephone equipment (such as a modem). For example, the public telephone system could be damaged if, instead of transmitting frequency signals, the modem were to inadvertently inject DC power into the telephone line. This situation is avoided because the modem must incorporate the FCC mandated DAA line interface circuit, thereby ensuring that such a damaging signal is not inadvertently transmitted onto the public telephone lines.

As already noted, modems are increasingly being used to interconnect computers via public telephone lines. Initially, modems were largely configured as external accessory units, housed in their own cases, and attached to a port-connector located on the personal computer via a cable (usually a RS-232 port and cable). The external modem is then electrically connected to the telephone line via a standard RJ-type connection scheme, as discussed above. Further, an external modem would be equipped with the standard DAA line interface circuitry, as also described above.

External modems are, and will continue to be, widely used. However, with the increased popularity of smaller portable computers (referred to variously as laptop, notebook, subnotebook or palm-top computers), external modems are less desirable because of their cumbersome size, their need for an additional cable and computer port and their consequent lack of portability. As such, the external modem is simply not conducive to the needs of a portable computer user. In response to this drawback, smaller modems have been developed that are formed as an integral component within the portable computer. This type of internal modem is located within the housing of the portable computer such that it may be directly interfaced with the telephone line via an RJ-11 physical/electrical media connector and associated cable. The internal modem is also necessarily equipped with the required DAA line interface circuitry.

Although such internal modems are more conducive to the portability requirements of a portable computer, they have several drawbacks. For instance, as an integral component, such an internal modem cannot be easily interchanged with other computers. Further, these types of internal modems also take up limited physical space within the portable computer, often at the expense of other computer components, such as an internal disk drive. Further, as computer housings have continued to be downsized—even to the extent of being hand-held—internal spatial restrictions have necessitated that modems be even further reduced in size, without giving up functionality.

Such requirements have resulted in the establishment of standards for the internal accessories of the computer. One set of standards applicable to memory cards has been developed by the Personal Computer Memory Card International Association (PCMCIA). This organization is comprised of hundreds of manufacturers of memory cards and related peripheral equipment. The PCMCIA has published specifications setting forth the spatial standard for all memory cards used in downsized computers as being restricted to a rectangular space approximately 55 millimeters in width, 85 millimeters in length, and 5 millimeters in depth (commonly referred to as the PCMCIA Type II standard).

In keeping with the PCMCIA standards for memory cards, internal modem manufacturers have adopted the same spatial standards for use with their down-sized modem cards. By complying with the standards established by PCMCIA for memory cards, modem card manufacturers have assured themselves of compatibility and spatial conformity with computers utilizing and complying with the PCMCIA specifications.

The constraints imposed by the PCMCIA specification have resulted in the development of "credit card" sized modem cards. Thus, most of the components formerly housed in an external or integral modem are now contained within a credit-card sized, PCMCIA card. As with any PCMCIA component, a PCMCIA modem card is merely inserted into any computer equipped with a PCMCIA compliant socket. In this way, a PCMCIA modem is interchangeable with other computers, and requires only a minimal amount of physical space.

Although much reduced in size, a PCMCIA modem is interfaced with an external telephone subscriber line in the same manner as an external or internal modem. Thus, a PCMCIA modem can be connected to the telephone line via a standard, RJ-type connector interface and cable. Further, the PCMCIA modem card also includes the standard DAA line interface circuitry previously discussed.

Because the PCMCIA modem card is equipped with a standard RJ-type connector, portable computer users can connect to a telephone line and communicate from almost anywhere in the world. Although this is an important advantage of a PCMCIA modem equipped portable computer, the capability also raises an important problem.

Many offices, hotels, schools and similar buildings are wired such that the telephone equipment contained within the building is not connected directly to the public telephone system. Rather, buildings are increasingly equipped with "Private Branch Exchanges" (PBX). A PBX is an automatic switching system that is used to interconnect terminal equipment, such as telephone sets, within a building or campus of buildings. When communication is required outside of the building, the PBX will act as a gateway to the public telephone network.

Typically, telephone equipment is connected to a PBX installation with a standard RJ-type connector, as described above. However, although the physical connection between the PBX and the telephone equipment is the same, some PBX equipment utilizes the electrical wires, or leads, contained within the RJ-11 connection in a manner different from the public telephone network. For example, some PBX systems utilize the two center leads of an RJ-11 connector, commonly referred to as the "tip" and the "ring" leads, in a manner that is significantly different from a public telephone company. More specifically, these PBXs utilize the tip and ring leads to supply power to the telephone sets that are designed to be used with that particular PBX system. This power is usually supplied as a DC voltage—typically in the range of 12 to 90 volts—that is applied across the tip and ring leads. However, no resistance is supplied to limit the current supplied. In contrast, the public telephone company places approximately 48 volts across the tip and ring leads, but the current is limited by a resistance of 400 Ohms to 1750 Ohms placed in series with the 48 volt source (thereby resulting a line-current that is usually less than around 120 mA).

Thus, problems can arise when a piece of telephone equipment, such as a PCMCIA modem, is plugged into a RJ-type telephone jack connected to a PBX. If the PBX utilizes the tip and ring leads in the manner described above, the higher supply voltage of the PBX is applied across the DAA line interface circuitry. Since the resulting current drawn by the DAA circuitry is not limited, and thereby excessively high (i.e., greater than the maximum acceptable level of approximately 120 mA), the DAA circuitry can be destroyed, and the PCMCIA modem thereby rendered inoperative. This problem is exacerbated by the fact that a portable computer user is usually unaware as to whether a particular RJ-11 (or similar RJ-type connector) telephone jack is connected to such a PBX. Consequently, the user may inadvertently plug the PCMCIA modem into such a "standard looking" jack, and thereby render the modem inoperative.

Solutions to this particular problem have heretofore not been entirely satisfactory. One solution is to protect the DAA line interface circuitry with a fuse type device. If the PCMCIA modem is taken "off-hook" while connected to a PBX that supplies an excessively high current, the fuse or fusible resistor will open, and thereby protect the DAA line interface circuitry. However, the fuse must then be physically replaced before the modem is again operative. Although this approach may work in an external type modem, wherein the fuse is relatively easy to access and replace, it is not practical in a PCMCIA modem card, wherein the electrical components are miniaturized and disposed within a sealed enclosure. Typically, the PCMCIA card must be returned to the manufacturer to have the fuse replaced—a costly and time consuming process.

Further, as is well known, the reaction time of a fuse is relatively slow and often unpredictable. Since fuses are generally slow to react to an excessive current, the DAA line interface circuitry must utilize components that are rated higher (and are thus physically larger) so as to compensate for the additional wattage consumed before the fuse reacts. This is not practical in a PCMCIA card environment, wherein physical space is extremely limited.

Finally, as noted above, the portable computer user is often unaware that a particular telephone jack is connected to a PBX system that will cause damage to the PCMCIA modem's DAA circuitry. Thus, even if a PCMCIA modem card is equipped with a fuse, and the modem is inadvertently connected to such a PBX, the modem will no longer be operable because the fuse remains open. The user typically will not know why the PCMCIA modem card has failed and is no longer operative. Diagnosis of the problem is very difficult—again resulting in a costly and time consuming process.

Similar "fuse" like devices have the same drawbacks. For instance, circuit breaking or current limiting devices are also generally slow to react. Further, these types of devices are relatively large, and again cannot physically fit within the limited space of a PCMCIA card.

Therefore, there remains a need for a line-current protection circuit that will insure that the DAA line interface circuitry is not damaged when inadvertently subjected to an excessively high current, and yet is functional within a PCMCIA-architecture card environment.

OBJECTS AND BRIEF SUMMARY OF THE INVENTION

The present invention has been developed in response to the present state of the art, and in particular, in response to the problems and needs in the art not heretofore fully or completely solved by line current protection schemes used in connection with PCMCIA-architecture modem cards. However, it is not intended that the apparatus of the present invention will necessarily be limited solely to PCMCIA modem cards, since it may also find useful application with other devices requiring protection from exposure to excessive line-current conditions. Thus, it is an overall object of the present invention to provide a line-current protection circuit which provides for cost effective and reliable protection of circuitry from an excessive line current condition.

Another object of the present invention is to provide a line-current protection circuit which utilizes electrical components which physically can be used within the limited space of a PCMCIA-architecture card.

Yet another object of the present invention is to provide a line-current protection circuit that is capable of detecting and responding to an excessive line current condition fast enough so as to insure that standard DAA line interface components used within a PCMCIA modem card are not damaged.

Still another object of the present invention is to provide a line-current protection circuit which is automatically reset after the excessive line current condition is removed, so that there is no need to physically remove or otherwise replace circuit components.

A further object of the present invention is to provide a line current protection circuit which is capable of indicating the presence of an excessive line current condition such that the PCMCIA modem user is aware of the condition and the reason for the modem's inoperability.

Additional objects and advantages of the present invention will become more fully apparent from the following more detailed description taken in conjunction with the drawings and claims, or may be learned by the practice of the invention.

Briefly summarized, the foregoing and other objects are achieved with a novel line-current protection circuit. The protection circuit is particularly advantageous in that it can be used within a PCMCIA-architecture modem card. The protection circuit is oriented so as to be placed in series with the tip lead of a telephone subscriber loop once the PCMCIA modem is plugged into the telephone subscriber loop via a standard RJ-type, or similar, connection. When connected to the telephone line in this manner, a DC voltage is presented to the DAA line interface circuitry across the tip and the ring leads of the telephone line. If an excessive line current is presented to the DAA line interface circuitry, that fault condition will be detected by the protection circuit, which will then respond by automatically disconnecting the DAA circuitry from between the tip and ring leads. This automatic disconnection occurs rapidly, before any damage is caused to the DAA circuit electrical components. Further, the connection will not be permitted to be reestablished until such time as the excessive line current condition is removed.

The line-current protection circuit is comprised of a relay means, which is connected between the DAA interface circuitry and the tip lead of the telephone line, and which selectively provides for either an open or a closed connection between the DAA circuitry and the tip and ring leads of the telephone line. The protection circuit is further comprised of a detection means, which is capable of detecting the magnitude of the line current that is presented to the DAA line interface circuitry, and which then causes the relay means to either open or close, depending on the magnitude of the line current. Thus, if the line current exceeds a predetermined maximum, such as approximately 120 mA, the detector means will sense that condition and therefore cause the relay means to open the circuit connection between tip and ring leads. In this manner, excessive current does not reach the DAA line interface circuitry.

In a preferred embodiment of the protection circuit of the present invention, the detection means is comprised of a current sensing means which is for providing an Excessive Line Current signal when the magnitude of the line current presented to the DAA circuitry exceeds a predetermined magnitude. The detection means is further comprised of a controller means which, depending on the state of the Excessive Line Current signal, will cause the relay means to be opened or closed.

The protection circuit may further include a backup fuse means, also connected between the DAA interface circuitry and the tip lead of the telephone line, which is for opening the connection between the DAA interface circuitry and the tip and ring leads if the line current were to exceed a second predetermined maximum magnitude. This fuse means acts as a backup protection in the event that the components making up the relay means or detector means were to fail.

BRIEF DESCRIPTION OF THE DRAWINGS

In order to more fully understand the manner in which the above-recited and other advantages and objects of the invention are obtained, a more particular description of the invention will be rendered by reference to specific embodiments thereof which are illustrated in the appended drawings. Understanding that these drawings depict only typical embodiments of the invention and are therefore not to be considered limiting of its scope, the invention in its presently understood best mode for making and using the same will be described with additional specificity and detail through the use of the accompanying drawings in which.

DETAILED DESCRIPTION OF THE PRESENTLY PREFERRED EMBODIMENTS

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Figure 1:
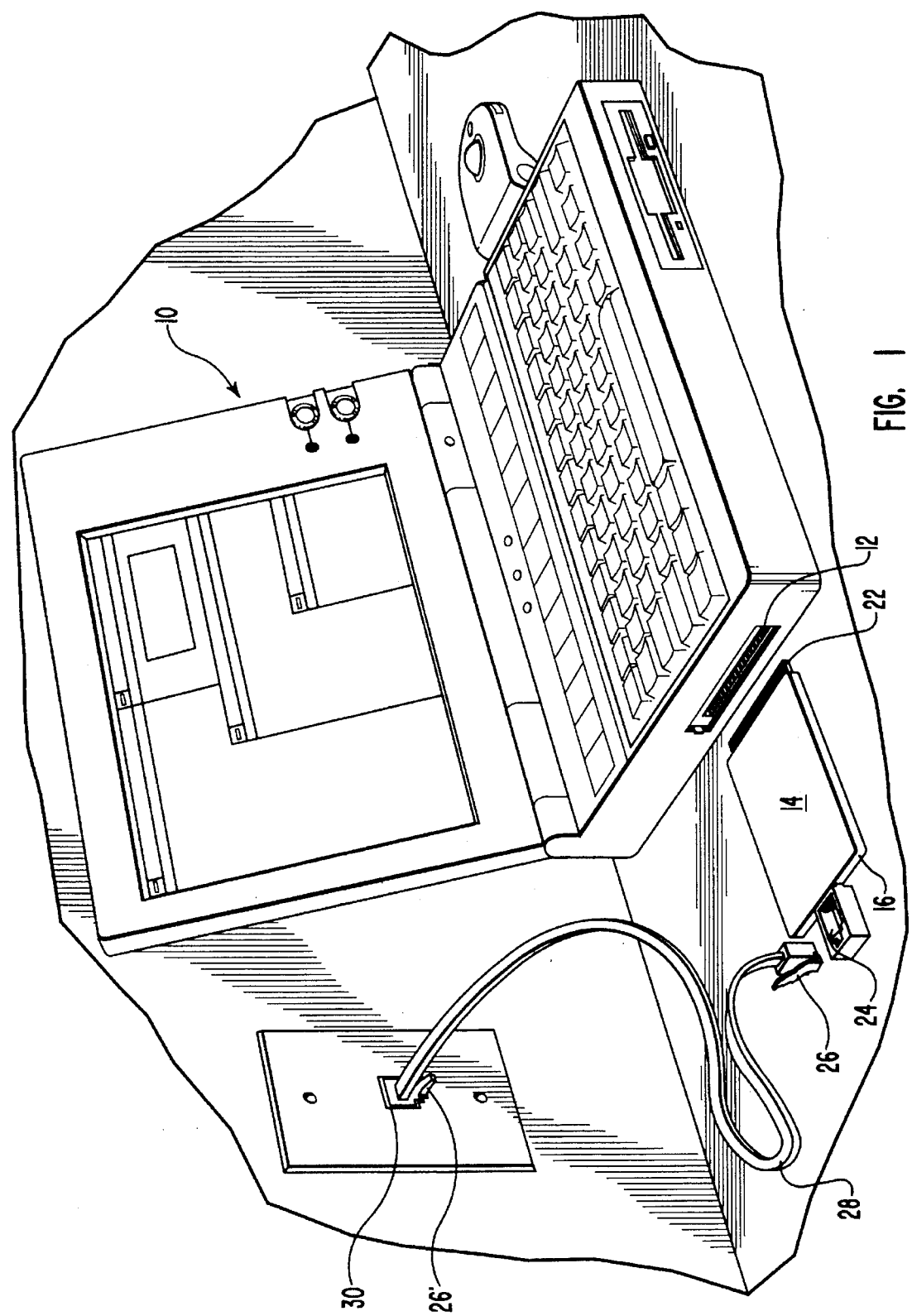
FIG. 1 is a perspective view of one environment in which the protection circuit of the present invention may be used.

Referring now to FIG. 1, illustrated is a typical environment in which the line-current protection circuit of the present invention can be used. A portable computer, designated generally at 10, is shown as having a PCMCIA socket 12. The PCMCIA socket 12 is designed so as to be capable of receiving any PCMCIA-architecture compliant card, as for instance the PCMCIA modem card illustrated and designated generally at 14. As is shown, modem card 14 is a standard PCMCIA card, having a plastic type enclosure 16 in which is disposed a printed circuit board 18 (shown in FIG. 2) onto which is placed the modem's various electrical components 20 (also shown in FIG. 2). Formed along one edge of the PCMCIA modem card 14 is an edge connector 22, which is designed to be detachably received within a corresponding connector slot (not shown) disposed within the PCMCIA socket 12. In this way, the PCMCIA modem card 14 is electrically interfaced with the portable computer 10.

Formed on the opposite edge of the PCMCIA modem card 14 is a standard RJ-11 socket-connector 24, which is designed to detachably receive a standard RJ-11 plug 26 and telephone wire 28 assembly. The opposite end of the wire 28 is also equipped with a RJ-11 plug 26', which is then detachably received within a RJ-11 telephone-jack 30, i.e., as would commonly be found on the wall of a office, etc. The telephone-jack 30 is in turn electrically connected to the public telephone lines, either directly or via a Private Branch Exchange (not shown). In this way, the PCMCIA modem card 14 is electrically connected to a telephone subscriber loop.

Figure 2:
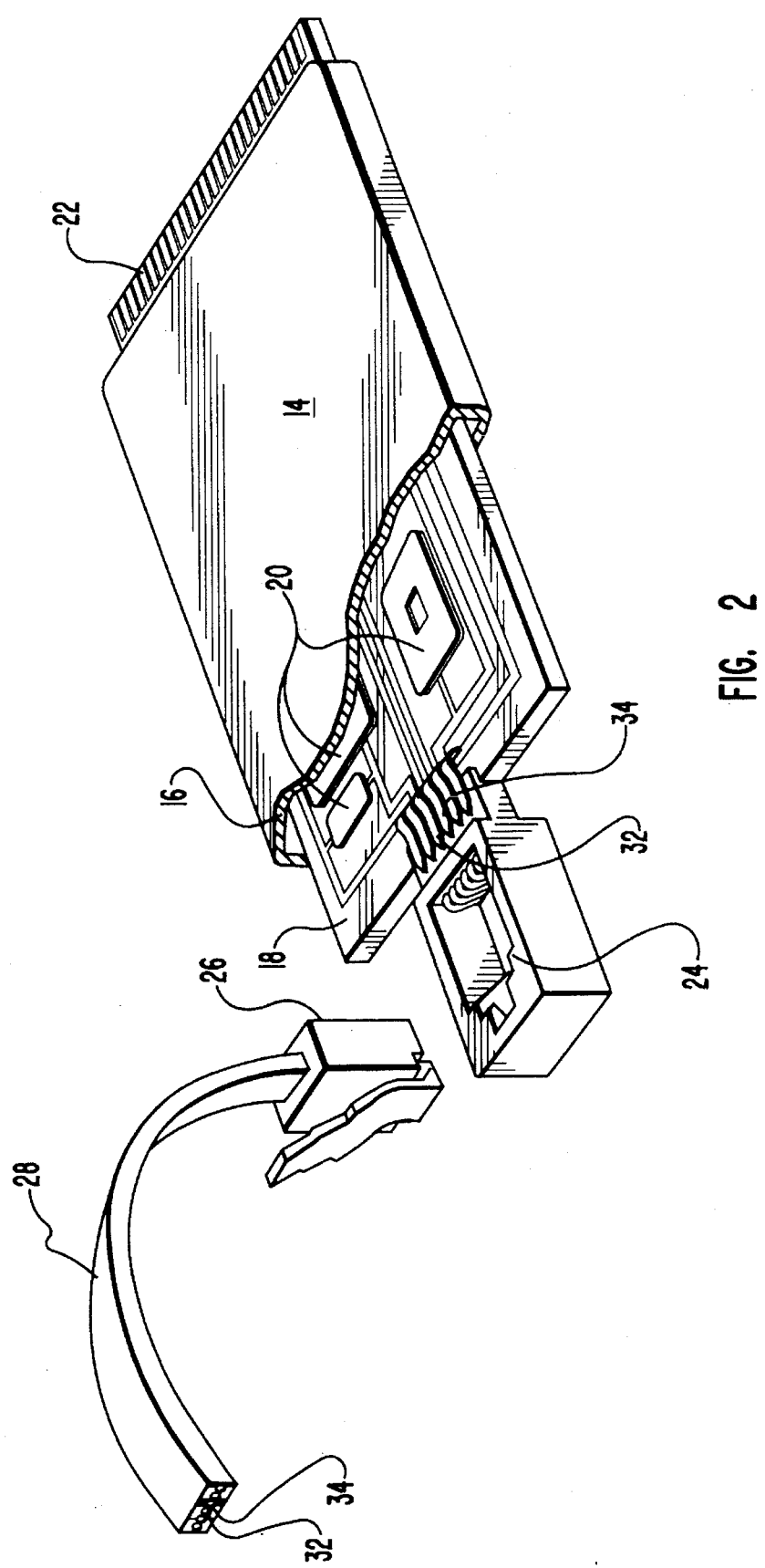
FIG. 2 is an exploded perspective view, illustrating a partial cross-sectional view of a PCMCIA modem card, the circuit components contained thereon, and the manner in which the card typically is connected to an external telephone subscriber loop, including the incoming tip and ring leads of an RJ-11 6-position connection.

Referring now to FIG. 2, illustrated is an enlarged perspective view of the PCMCIA modem card 14 of FIG. 1. As generally discussed, modem card 14 is equipped with a standard RJ-11 socket connector 24, designed to detachably receive a twisted-pair telephone wire 28 via a RJ-11 plug 26 assembly. It will be appreciated that this RJ-11 connection scheme, although described as an RJ-11 connector, could be any type of RJ-type connector. For instance, some PBX systems utilize an RJ-45 connector.

Typically, the telephone wire 28 will be comprised of six (6) separate wire leads. Although the number of wire leads may vary (for instance, there may be eight or four leads), there are generally a minimum of two center lead wires, referred to as a tip lead 32 and a ring lead 34. As is further shown, the tip 32 and ring 34 leads are electrically interfaced with the circuit components 20 contained on the printed circuit board 18 contained within the PCMCIA enclosure 16. As discussed above, a portion of the circuit components 20 comprise a portion of line interface circuitry, commonly referred to as a Data Access Arrangement circuit, which acts as an electrical interface between the telephone line and the rest of the modem circuitry.

Figure 3:
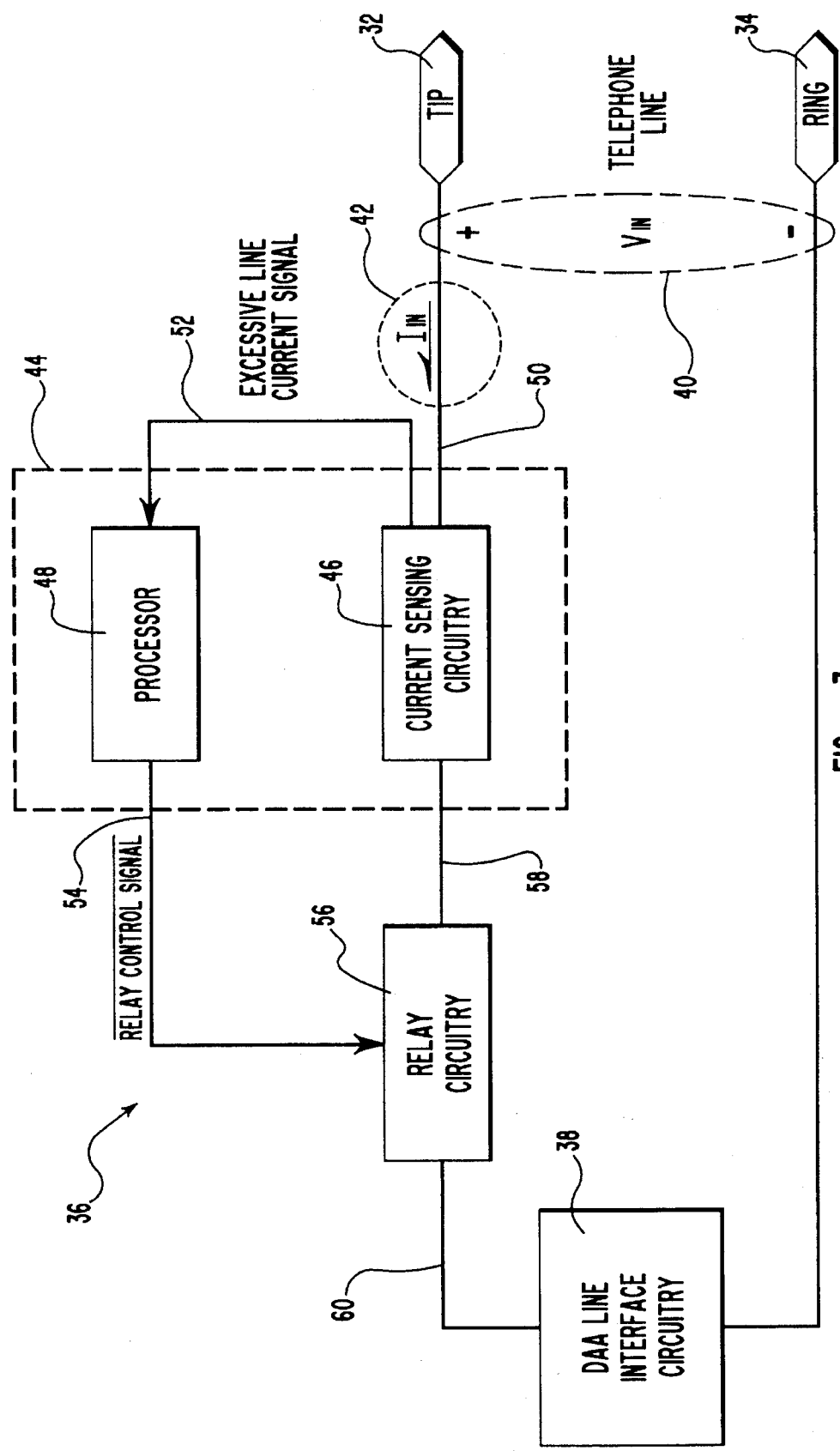
FIG. 3 is a functional block diagram which schematically illustrates the primary components of one presently preferred line-current protection circuit of the present invention.

Referring now to FIG. 3, a functional block diagram illustrating one presently preferred embodiment of the current invention is shown. The protection circuit, designated generally at 36, comprises, by way of example, relay means for selectively providing an open or a closed connection between the DAA Line Interface Circuitry 38 and the tip and the ring leads 32, 34; and a detection means, which detects the magnitude of any line current that is being supplied to the DAA line interface circuitry 38, and which is also for causing the relay means to open or close, depending on the magnitude of that line current. In one preferred embodiment, the detection means comprises, for example, a current sensing means for providing an "Excessive Line Current" signal when the magnitude of the line current presented to the DAA circuitry 38 via the tip lead 32 exceeds a predetermined magnitude, such as approximately 120 mA; and a controller means, which causes the relay means to be either opened or closed depending on the status of the Excessive Line Current signal.

With continued reference to FIG. 3, when the PCMCIA card 14 is detachably connected to a telephone subscriber loop, the tip 32 and the ring 34 leads are electrically connected across the DAA circuitry 38, and a DC voltage potential $V_{IN}$, indicated at 40, will be present across the tip and ring leads 32, 34. The magnitude of that voltage will vary, depending on the nature of the telephone subscriber loop to which the modem card 14 is connected. For example, if the subscriber loop is connected directly to the public telephone system, the voltage will be approximately 48 volts, limited by a series resistance of approximately 400 Ohms to 1750 Ohms. In that case, the magnitude of the resulting current $I_{IN}$, shown as 42, is limited to a maximum of approximately 120 mA.

In contrast, if the modem card 14 is connected to the subscriber loop of a PBX system (not shown), the voltage $V_{IN}$ can be anywhere in the range of 12 to 90 volts—without any resistance to the resulting current $I_{IN}$. In that case, the magnitude of current $I_{IN}$ that is supplied to the DAA circuitry 38 can exceed the desired maximum magnitude of approximately 120 mA, and thereby destroy the DAA circuit components, rendering the modem card 14 inoperative.

As is shown in FIG. 3, detection means is comprised of, the functional components contained within the dotted box 44. In this embodiment, detection means is comprised of a current sensing means, as for example current sensing circuitry 46, and controller means, as for example programmable digital processor 48.

With continued reference to FIG. 3, the tip lead 32 of the incoming telephone line 28 is connected in series with the current sensing circuitry 46, as is schematically shown at line 50. The current sensing circuitry 46 is thereby positioned to detect the magnitude of line current $I_{IN}$ being supplied to the DAA circuitry 38. If the magnitude of that current exceeds a predetermined maximum, which in the preferred embodiment is approximately 120 mA, the current sensing circuitry 46 will generate an Excessive Line Current signal, as is schematically shown at line 52. The Excessive Line Current signal is then electrically connected, via line 52, to an input of the programmable digital processor 48.

Using programming techniques that are well known in the art, the digital processor 48 programmably monitors the status of the Excessive Line Current signal present on line 52. If the line current $I_{IN}$ 42 exceeds the maximum allowable level of 120 mA, the current sensing circuitry 46 will indicate the fault condition by asserting the Excessive Line Current signal input to the digital processor 48. The digital processor 48 is programmed to respond to the fault condition by asserting a Relay Control Signal, as is indicated at line 54.

FIG. 3 further illustrates how protection circuit 36 is comprised with a relay means, as for example relay circuitry 56. Relay circuitry 56 is also connected in series with the tip lead 32, as is schematically illustrated at line 58. Relay circuitry 56 can be operated so as to selectively open or close the circuit connection between the DAA circuitry 38 and the tip and the ring leads 32, 34. The relay circuitry 56 will be opened or closed depending on the status of the Relay Control Signal generated by the digital processor 48, as is shown at line 54. Thus, if Relay Control Signal is asserted, thereby indicating an excessive line current fault condition (i.e., line current $I_{IN}$ 42 exceeds 120 mA), relay circuitry 56 will open, and prevent the line current $I_{IN}$ from damaging the DAA circuitry 38. This condition is otherwise referred to as an "On-Hook" state, wherein the PCMCIA modem card 14 is effectively disconnected from the telephone line. When the line-current is below the maximum allowable amount (i.e., the modem card 14 is plugged in to a telephone socket having a standard voltage present across the tip and the ring leads 32, 34), the Relay Control Signal will not be asserted by digital processor 48, and the relay circuit 56 will close, thereby completing the circuit connection between the DAA circuit 38 and the tip and ring leads 32, 34, as is schematically shown at line 60. This condition is otherwise known as an "Off-Hook" state, wherein the modem card 14 can send and receive data via the telephone line.

An important advantage of the protection circuit 36 is its capability to automatically and dynamically open or close the circuit connection depending on the magnitude of the line-current $I_{IN}$. Advantageously, when the fault condition is removed (i.e., the user plugs the modem card into a telephone-jack not having an excessive line-current $I_{IN}$), the modem will function correctly. There is no need to have components, such as burned fuses, replaced. Further, in the preferred embodiment, the digital processor 48 is the processor which is used to perform the PCMCIA modem's general command processing functions and the host (e.g., the portable computer utilizing the PCMCIA modem card) interface functions. Thus, when a fault-condition does occur, and the digital processor 48 causes the relay circuitry 56 to open, the digital processor 48 will also be programmed to cause a text string signal to be displayed on the screen of the host computer. This text screen will inform the user that an excessive line-current condition exists at the telephone-jack in which the PCMCIA-modem is connected. In this way, the user is alerted as to why the modem is not functioning.

Figure 4:
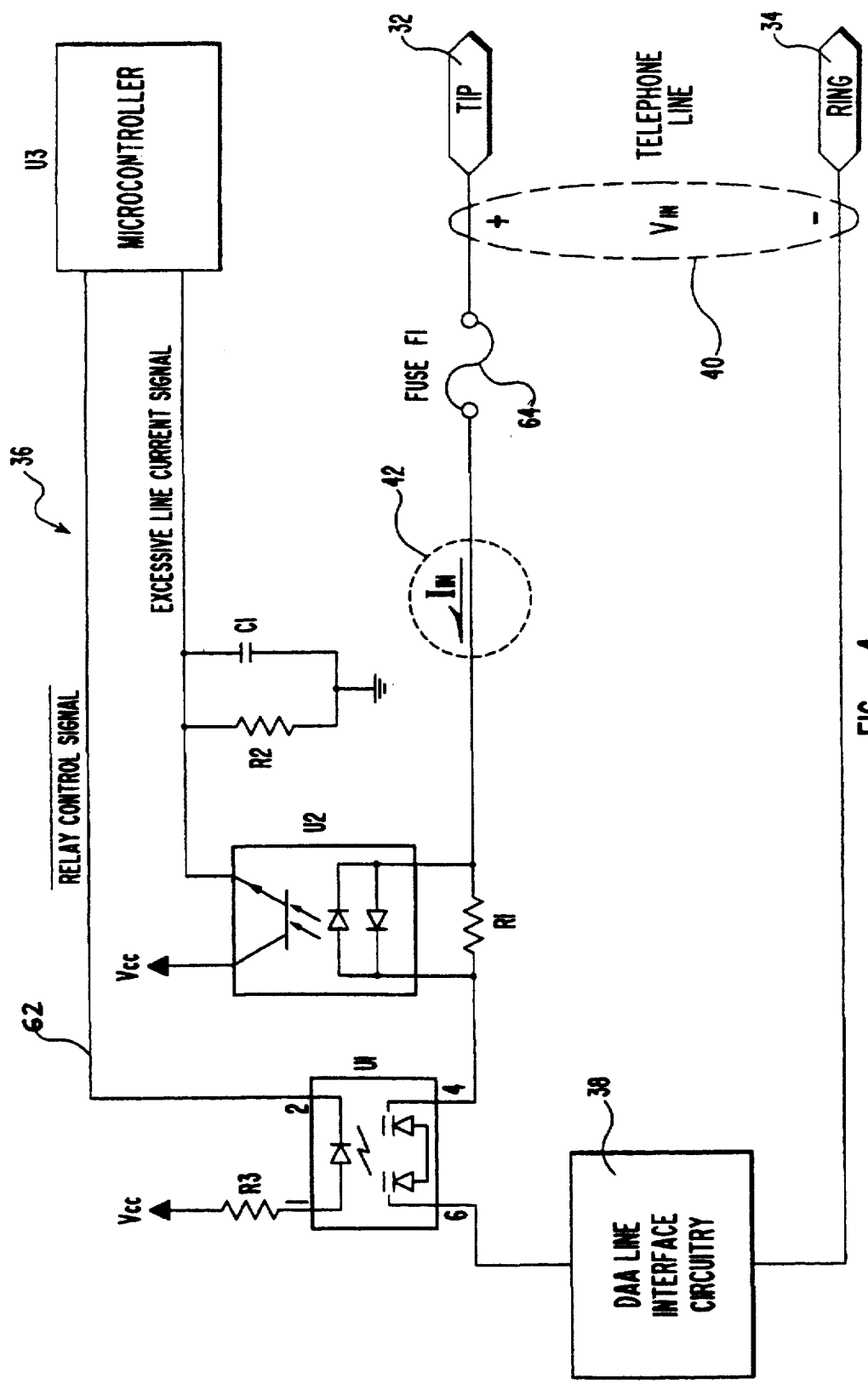
FIG. 4 is a detailed electrical schematic diagram which illustrates, as an example, the presently preferred embodiment and presently understood best mode for implementing the line-current protection circuit of the present invention.

Referring now to FIG. 4, an electrical schematic of the presently preferred embodiment of the protection circuit 36 is shown. The current sensing circuitry (46 in FIG. 3) is comprised of, for example, a sensing resistor R1 placed in series with the tip lead 32 so that line-current $I_{IN}$ passes therethrough. It will be appreciated that the sensing resistor R1 could alternatively be placed in series with the ring lead 34, and still have line-current $I_{IN}$ pass therethrough. Connected across the sensing resistor R1 is an optoelectronic device, such as photo-coupler U2. Thus, line-current $I_{IN}$ will generate a voltage across sensing resistor R1, the magnitude of which will vary in proportion with the magnitude of $I_{IN}$ in compliance with Ohm's law. As long as $I_{IN}$ is sufficiently low (i.e., below approximately 120 mA), the photo-responsive transistor portion of U2 will not conduct, and the Excessive Line Current signal output will stay grounded through pull-down resistor R2. Once the magnitude of line-current $I_{IN}$ exceeds an allowable maximum, as for example 120 mA, the resulting voltage across R1 will cause the corresponding photo-emitting diode of device U2 to turn on. The photo-responsive transistor portion of U2 will respond by conducting, and thereby asserting the Excessive Line Current Signal, by pulling it high.

False signals, such as transient spikes on the output of photo-coupler U2, are avoided by placing a capacitor C1 in parallel with the pull-down resistor R2. Alternatively, capacitor C1 could be placed in parallel with sensing resistor R1, on the photo-responsive transistor of U2. Also, C1 can be eliminated completely and any false signals can instead be detected by the digital processor/microcontroller V3. In this embodiment, the microcontroller V3 will be programmed to check for the presence of the Excessive Line Current Signal twice. If the signal is detected, the processor will wait for an amount of time, such as one millisecond, and then recheck the status of the signal. In this way, the microcontroller V3 can insure that the first occurrence of the signal was not merely a transient, false signal, as may be caused by line noise or other conditions.

Advantageously, photo-coupler U2 is available as a single component, mounted in a small outline package, which can easily be mounted within the PCMCIA card 14 enclosure. Further, the device U2 provides the current sensing function, and yet has galvanic isolation from the telephone line, and thus has no need for an earth-ground voltage measurement reference and is largely impervious to large common-mode 60 Hz noise signals. One presently preferred photo-coupler U2 is the device made by NEC Corporation and identified by the part number PS2705-1.

As discussed, the Excessive Line Current Signal is supplied to an input of a digital processor (48 in FIG. 3). In the preferred embodiment, the digital processor 48 is comprised of a microcontroller U3, which is used to perform the PCMCIA modem's general command processing functions and the host (e.g., the portable computer utilizing the PCMCIA modem card) interface functions. A preferred microcontroller U3 is available as part of a chip-set manufactured and sold by Rockwell Corporation and known as the RC96ACL/RC144ACL integrated data/fax/voice modem device set family. This microcontroller U3 is more particularly known as a Rockwell C29 or C39 microcomputer. It will be appreciated that various other digital microprocessors, which are well known in the art, could also be used.

Microcontroller U3 is programmed, using techniques that are well known in the art, to continuously monitor the Excessive Line Current signal output by Opto-Coupler U2. When line-current $I_{IN}$ exceeds approximately 120 mA, the signal is asserted, and the microcontroller responds by asserting the Relay Control signal, which is electrically connected to relay circuitry (56 in FIG. 3).

The relay circuitry is comprised of, for example, a solid-state relay device, which in the preferred embodiment is a photo-MOS relay U1, sold by Aromat and known by the part number AQV214S. The Relay Control Signal is input to the relay device, as is schematically shown at line 62, so as to control the current flow through the LED portion of the photo-MOS relay U1. Thus, when a fault condition exists (i.e., excessive line current), microcontroller U3 asserts Relay Control Signal, thereby causing a non-conduct state through the relay device and resulting in an open circuit, or "On-Hook" state. In this state, line-current $I_{IN}$ does not reach the DAA line circuitry. In contrast, when Relay Control Signal is not asserted, the relay is in a closed position and the PCMCIA modem will be in an "Off-Hook" state, and function as intended.

Importantly, the protection circuit 36, using the above described components, is capable of detecting and responding to an excessively high line-current in the range of from 1 to 2 milliseconds. This insures that none of the DAA line interface circuit components are damaged by the high current.

FIG. 4 also illustrates the preferred embodiment as having a backup fuse means, such as fuse 64, which is connected in series with the tip lead 32 and the DAA line interface circuitry. Fuse 64 is for providing backup protection to the DAA line interface circuitry, and will open up the circuit connection in the event that the other circuit components fail, and the line-current $I_{IN}$ exceeds a second predetermined maximum magnitude, such as 250 mA.

Table A provides values for the various circuit components in the circuit of FIG. 4. It should be appreciated that the particular circuit components and circuit design illustrated in FIG. 4 are intended merely as an example of the presently preferred embodiment and the presently understood best mode of implementing the overall functions which are represented by the block diagram of FIG. 3. Of course other circuit components can be devised that would also work satisfactorily.

TABLE A

COMPONENT VALUES FOR
LINE CURRENT PROTECTION CIRCUIT (FIG. 4)

| Component | Value |
|---|---|
| $R_1$ | 10 Ω |
| $R_2$ | 390 Ωn |
| $R_3$ | 100 Ω |
| $C_1$ | .01 μf |
| $F_1$ | .25 A |

In sum, the line-current protection circuit as described above addresses the previously unsolved problems in the prior art. The line-protection circuit insures that the DAA line interface circuitry of a modem is not damaged when the modem is inadvertently connected to a telephone line having an excessive line-current. Further, the circuit provides this protection while at the same time utilizing circuit components that physically can be used within a PCMCIA-architectured environment. Also, the protection circuit automatically resets when the fault condition is removed, and thus electrical components do not have to be replaced, nor is any servicing required on the modem card. Finally, when the fault condition does exist, the protection circuit is capable of causing a message to be displayed on the host computer, thereby notifying the user of the error condition. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Patent is:

1. A protection circuit intended for use with a line interface circuit that is electrically connectable to a telephone line, the protection circuit comprising:

relay means, connected between the interface circuit and the telephone line, for selectively providing an open or a closed connection between the line interface circuit and the telephone line; and detection means for detecting the magnitude of a line-current presented to the interface circuit via a supply voltage placed across the telephone line and for causing the relay means to be opened or closed depending on the magnitude of the line-current.

2. A protection circuit as recited in claim 1, wherein the relay means comprises a solid-state relay device that is selectively operable to be either in a closed or an opened arrangement.

3. A protection circuit as recited in claim 1, further comprising a backup fuse means, connected between the line interface circuit and the telephone line, for opening the connection between the line interface circuit and the telephone line when the line-current exceeds a second predetermined maximum magnitude.

4. A protection circuit as recited in claim 1, wherein the detection means comprises:

current sensing means for providing an excessive line current signal when the magnitude of the line-current exceeds a predetermined magnitude; and controller means, responsive to the excessive line current signal, for activating the relay means.

5. A protection circuit as recited in claim 4, wherein the current sensing means comprises:

a sensing resistor connected between the telephone line and the line interface circuit such that said line-current flows therethrough; and an optoelectronic device connected in parallel with the sensing resistor such that the optoelectronic device responds to the line-current flowing through the sensing resistor by providing the excessive line current signal when the line-current exceeds a predetermined magnitude.

6. A protection circuit as recited in claim 4, wherein the controller means comprises a digital processor, the digital processor being electrically connected to both the current sensing means and the relay means, whereby the digital processor programmably causes the relay means to be either opened or closed depending upon the status of said excessive line current signal.

7. A protection circuit intended for use with a line interface circuit that is electrically connectable to a telephone line, the protection circuit comprising:

relay means, connected between the line interface circuit and the telephone line, for selectively providing an open or a closed connection between the line interface circuit and the telephone line;

current sensing means for providing an excessive line current signal when a line-current presented to the interface circuit via a supply voltage placed across the telephone line exceeds a predetermined magnitude; and controller means, responsive to the excessive line current signal, for controlling the relay means.

8. A protection circuit as recited in claim 7, wherein the relay means comprises a solid-state relay device that is selectively operable to be either in a closed or opened arrangement.

9. A protection circuit as recited in claim 8, wherein the current sensing means comprises:

a sensing resistor connected between the telephone line and the line interface circuit such that said line-current flows therethrough; and a optoelectronic device connected in parallel with the sensing resistor such that the optoelectronic device responds to the line-current flowing through the sensing resistor by providing the excessive line current signal when the line-current exceeds a predetermined magnitude.

10. A protection circuit as recited in claim 9, wherein the controller means comprises a digital processor, the digital processor being electrically connected to both the optoelectronic device and the relay device, whereby the digital processor programmably causes the relay device to be either opened or closed depending upon the status of said excessive line current signal.

11. A protection circuit as recited in claim 10, further comprising a backup fuse means, connected between the interface circuit and the telephone line, for opening the connection between the line interface circuit and the telephone line when the line-current exceeds a second predetermined maximum magnitude.

12. A protection circuit intended for use in a PCMCIA modem card having a telephone line interface circuit that is electrically connectable between the ring lead and tip lead of an external telephone subscriber line connector, the protection circuit comprising:

relay means, connected in series in the tip lead of the telephone line between the line interface circuit and the external telephone line connector, for selectively providing an open or a closed connection between the line interface circuit and the tip and the ring leads of the external telephone line connector;

current sensing means for providing an excessive line current signal when a line-current presented to the line interface circuit via a supply voltage placed across the tip lead and the ring lead of the telephone line exceeds a predetermined magnitude; and controller means, responsive to the excessive line current signal, for controlling the relay means, whereby the relay means opens or closes the connection depending on the status of the excessive line current signal.

13. A PCMCIA modem card protection circuit as recited in claim 12, wherein the relay means comprises a solid-state relay device that is selectively operable to be either in a closed or opened arrangement.

14. A PCMCIA modem card protection circuit as recited in claim 13, wherein the current sensing means comprises:

a sensing resistor connected in series with the ring lead between the external telephone line connector and the line interface circuit such that said line-current flows therethrough; and an optoelectronic device connected in parallel with the sensing resistor such that the optoelectronic device responds to the line-current flowing through the sensing resistor by providing the excessive line current signal when the current exceeds a predetermined magnitude.

15. A PCMCIA modem card protection circuit as recited in claim 14, wherein the current sensing means comprises:

a sensing resistor connected in series with the tip lead between the external telephone line connector and the line interface circuit such that said line-current flows therethrough; and an optoelectronic device connected in parallel with the sensing resistor such that the optoelectronic device responds to the line-current flowing through the sensing resistor by providing the excessive line current signal when the current exceeds a predetermined magnitude.

16. A PCMCIA modem card protection circuit as recited in claim 15, wherein the controller means comprises a digital processor, the digital processor being electrically connected to both the optoelectronic device and the relay device, whereby the digital processor programmably causes the relay device to be either opened or closed depending upon the status of said excessive line current signal.

17. A PCMCIA modem card protection circuit as recited in claim 16, further comprising a backup fuse means, connected in series with the tip lead between the line interface circuit and the external telephone line connector, for opening the connection between the line interface circuit and the tip and the ring leads when the line-current exceeds a second predetermined maximum magnitude.

18. A PCMCIA modem card protection circuit as recited in claim 16, further comprising a backup fuse means, connected in series with the ring lead between the line interface circuit and the external telephone line connector, for opening the connection between the line interface circuit and the tip and the ring leads when the line-current exceeds a second predetermined maximum magnitude.

19. A PCMCIA modem card having a telephone line interface circuit that is electrically connectable between the ring lead and tip lead of an external telephone subscriber line connector, and a protection circuit, the protection circuit comprising:

a solid-state relay device connected in series with the tip lead between the external telephone line connector and the line interface circuit, the relay device being selectively operable to be either in a closed or opened arrangement;

a sensing resistor connected in series with the tip lead between the external telephone line connector and the line interface circuit such that any line-current flowing through the tip lead to the interface circuit resulting from a supply voltage placed across the tip lead and the ring lead flows through the sensing resistor;

an optoelectronic device connected in parallel with the sensing resistor such that the optoelectronic device responds to the line-current flowing through the sensing resistor by providing an excessive line current signal when the line-current exceeds a predetermined magnitude;

a digital processor, the digital processor being electrically connected to both the optoelectronic device and the relay device, whereby the digital processor programmably causes the relay device to be either opened or closed depending upon the status of said excess line current signal.

20. A PCMCIA modem card protection circuit as recited in claim 19, further comprising a backup fuse, connected in series with the tip lead between the line interface circuit and the external telephone line connector, whereby the connection between the interface circuit and the tip and the ring leads is opened when the line-current exceeds a second predetermined maximum magnitude.

21. A PCMCIA modem card protection circuit as recited in claim 19, further comprising a backup fuse, connected in series with the ring lead between the line interface circuit and the external telephone line connector, whereby the connection between the interface circuit and the tip and the ring leads is opened when the line-current exceeds a second predetermined maximum magnitude.

22. A protection circuit intended for use in a PCMCIA modem card having a telephone line interface circuit that is electrically connectable between the ring lead and tip lead of an external telephone subscriber line connector, the protection circuit comprising:

relay means, connected in series in the ring lead of the telephone line between the line interface circuit and the external telephone line connector, for selectively providing an open or a closed connection between the line interface circuit and the tip and the ring leads of the external telephone line connector;

current sensing means for providing an excessive line current signal when a line-current presented to the line interface circuit via a supply voltage placed across the ring lead and the tip lead of the telephone line exceeds a predetermined magnitude; and controller means, responsive to the excessive line current signal, for controlling the relay means, whereby the relay means opens or closes the connection depending on the status of the excessive line current signal.

23. A PCMCIA modem card having a telephone line interface circuit that is electrically connectable between the ring lead and tip lead of an external telephone subscriber line connector, and a protection circuit, the protection circuit comprising:

a solid-state relay device connected in series with the ring lead between the external telephone line connector and the line interface circuit, the relay device being selectively operable to be either in a closed or opened arrangement;

a sensing resistor connected in series with the ring lead between the external telephone line connector and the line interface circuit such that any line-current flowing through the tip lead to the interface circuit resulting from a supply voltage placed across the tip lead and the ring lead flows through the sensing resistor;

an optoelectronic device connected in parallel with the sensing resistor such that the optoelectronic device responds to the line-current flowing through the sensing resistor by providing an excessive line current signal when the line-current exceeds a predetermined magnitude;

a digital processor, the digital processor being electrically connected to both the optoelectronic device and the relay device, whereby the digital processor programmably causes the relay device to be either opened or closed depending upon the status of said excess line current signal.

* * * * *

UNITED STATES PATENT AND TRADEMARK OFFICE
CERTIFICATE OF CORRECTION

PATENT NO. : 5,532,898

DATED : July 2, 1996

INVENTOR(S) : Tim U. Price

It is certified that error appears in the above-identified patent and that said Letters Patent are hereby corrected as shown below:

Figure 4, reference numeral "32" referring to the "relay control signal" line should be --62--

Col. 6, delete lines 60-67

Col. 9, line 35, begin a new paragraph beginning with "Referring"

Col. 9, line 64, "V3" should be --U3--

Col. 9, line 65, "V3" should be --U3--

Col. 10, line 3, "V3" should be --U3--

Col. 11, line 15, in the "R2" component, after the value "390" delete the "n" subscript.

Col. 12, line 47, "a" should be --an--

Signed and Sealed this

Eighteenth Day of August, 1998

Attest:

BRUCE LEHMAN

*Attesting Officer*  *Commissioner of Patents and Trademarks*